(12) United States Patent
Pedersen et al.

(10) Patent No.: US 8,971,361 B2
(45) Date of Patent: Mar. 3, 2015

(54) OPTICAL ARRANGEMENT AND METHOD

(75) Inventors: Christian Pedersen, Hvidovre (DK);
Peter Tideman-Lichtenberg, Horsholm (DK); Emir Karamehmedovic, Sarajevo (BA)

(73) Assignee: Danmarks Tekniske Universitet, Lyngby (DK)

( * ) Notice: Subject to any disclaimer, the term of this patent is extended or adjusted under 35 U.S.C. 154(b) by 810 days.

(21) Appl. No.: 13/054,420

(22) PCT Filed: Jul. 9, 2009

(86) PCT No.: PCT/EP2009/058745
§ 371 (c)(1),
(2), (4) Date: May 12, 2011

(87) PCT Pub. No.: WO2010/006985
PCT Pub. Date: Jan. 21, 2010

(65) Prior Publication Data
US 2011/0228807 A1  Sep. 22, 2011

Related U.S. Application Data

(60) Provisional application No. 61/171,652, filed on Apr. 22, 2009, provisional application No. 61/081,782, filed on Jul. 18, 2008.

(30) Foreign Application Priority Data

Jul. 18, 2008 (EP) .................................. 08160696
Apr. 22, 2009 (EP) .................................. 09158492

(51) Int. Cl.
*H01S 3/109* (2006.01)
*H01S 3/108* (2006.01)

(52) U.S. Cl.
CPC .................................. *H01S 3/1083* (2013.01)
USPC ............................................. 372/22; 372/23

(58) Field of Classification Search
USPC ......................................................... 372/21, 22
See application file for complete search history.

(56) References Cited

U.S. PATENT DOCUMENTS 3,629,603 A  12/1971  Andrews
4,948,212 A   8/1990  Cheng et al.
(Continued)

FOREIGN PATENT DOCUMENTS

EP  0301803 A2  2/1989
GB  1248791 A  10/1971

*Primary Examiner* — Xinning Niu
(74) *Attorney, Agent, or Firm* — Polsinelli PC; Teddy Scott, Jr.; Ron Galant

(57) ABSTRACT

Processing of incoherent electromagnetic radiation is described, said incoming incoherent electromagnetic radiation comprising radiation in a first wavelength interval. An arrangement comprises a focusing arrangement for focusing the incoming incoherent electromagnetic radiation, a first cavity configured to comprise an intra cavity laser beam, a nonlinear crystal arranged in the first cavity such that it is capable of receiving the focused incoherent electromagnetic radiation and, in dependence on the spatial overlap between the focused incoherent electromagnetic radiation and the intra-cavity laser beam, by interaction with the intra-cavity laser beam provide processed electromagnetic radiation, said processed electromagnetic radiation comprising radiation in a second wavelength interval. In other words, such an arrangement is capable of enabling imaging, e.g. by utilizing a detector that is sensitive in the second wavelength interval, a source of radiation that emits incoherently in a first wavelength interval.

20 Claims, 7 Drawing Sheets

(56) References Cited

U.S. PATENT DOCUMENTS

| | | | |
|---|---|---|---|
| 5,452,312 A * | 9/1995 | Yamamoto et al. | 372/5 |
| 2004/0228372 A1 * | 11/2004 | Vodopyanov et al. | 372/21 |
| 2005/0238069 A1 * | 10/2005 | Ohkubo et al. | 372/21 |
| 2006/0280219 A1 * | 12/2006 | Shchegrov | 372/99 |
| 2008/0030736 A1 * | 2/2008 | Thrush et al. | 356/445 |
| 2009/0059968 A1 * | 3/2009 | Luo et al. | 372/18 |

* cited by examiner

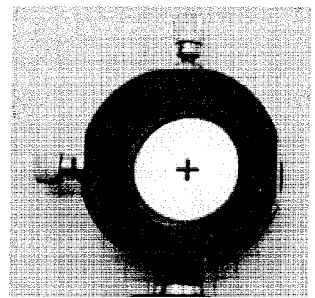 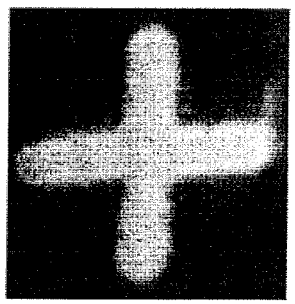 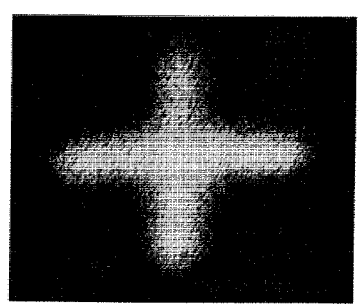
*Fig. 3a*  *Fig. 3b*  *Fig. 3c*
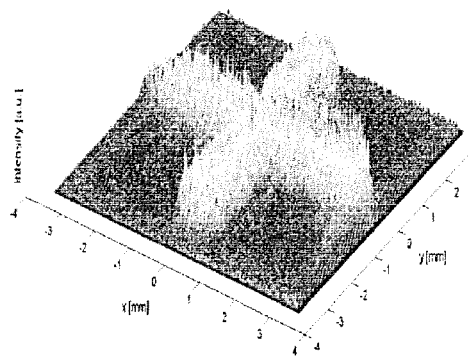 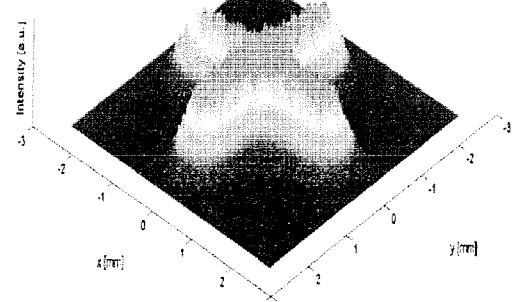
*Fig. 4a*  *Fig. 4b*

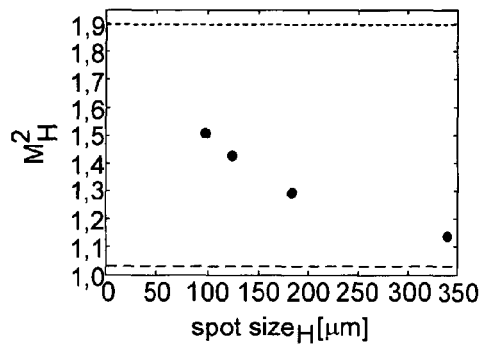 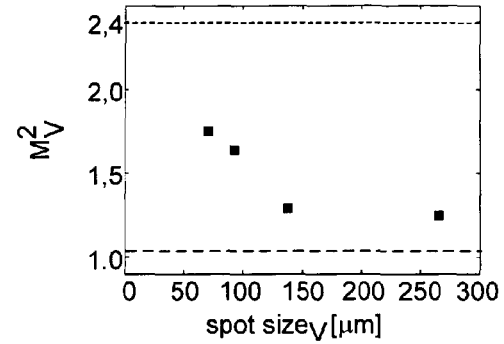
*Fig. 9a*  *Fig. 9b*
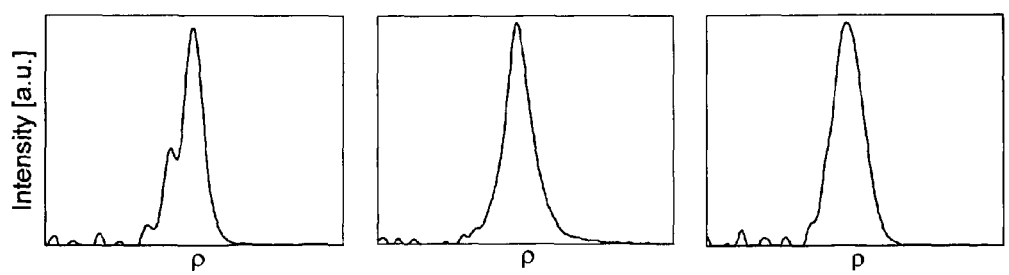
*Fig. 10a*  *Fig. 10b*  *Fig. 10c*

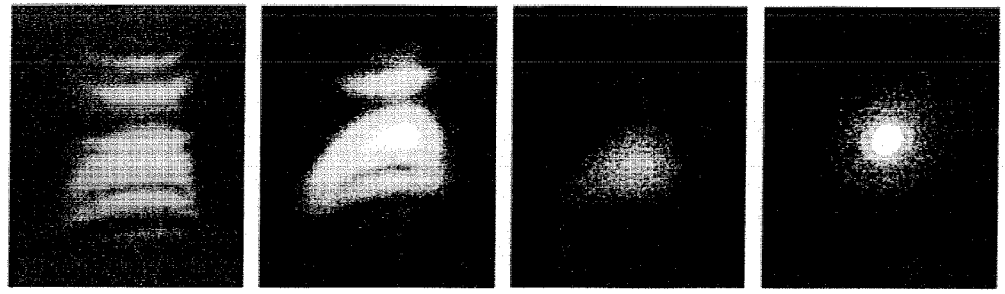
*Fig. 11a*     *Fig. 11b*     *Fig. 11c*     *Fig. 11d*
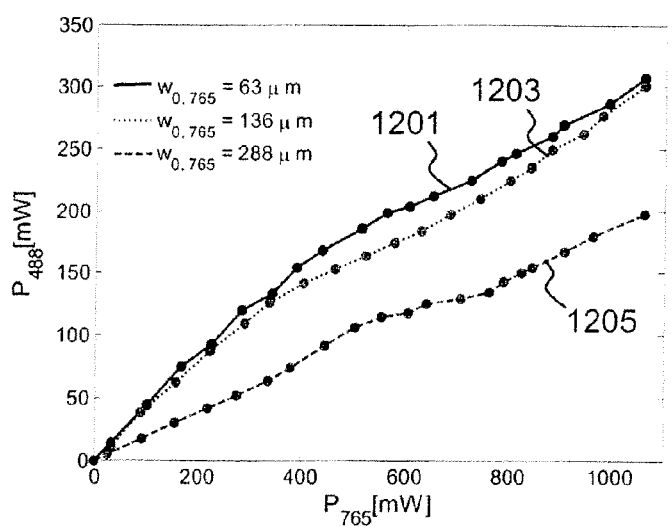
*Fig. 12*

OPTICAL ARRANGEMENT AND METHOD

CROSS-REFERENCE TO RELATED APPLICATIONS

This is the national stage of International Application No. PCT/EP2009/058745, filed on Jul. 9, 2009, which claims the benefit of European Patent Application No. 08160696.4, filed on Jul. 18, 2008, European Patent Application No. 09158492.0, filed on Apr. 22, 2009, U.S. Provisional Application No. 61/081,782, filed on Jul. 18, 2008 and U.S. Provisional Application No. 61/171,652, filed on Apr. 22, 2009, the contents of all of which are incorporated herein by reference.

TECHNICAL FIELD

The present invention relates to the use of a laser to process light.

BACKGROUND

The use of lasers for processing light includes conversion of light from one part of the electromagnetic spectrum to another part of the spectrum. Typically, such processing involves the use of a nonlinear crystal in which an intensive laser beam interacts with an input laser beam, resulting in an output laser beam having a wavelength that is different from the intensive laser beam and the input beam. An example of a system in which such processing is performed is described in European patent published as EP0301803.

A drawback with such a prior art system is that it is incapable of processing of input light that is incoherent. For example, imaging of spatially extended sources that emit or reflect incoherent light is impossible in such a prior art system.

Such a prior art system is also not advantageous when a high quality laser beam is desired. In order to produce a high quality beam, the beam can e.g. be spatially filtered through a pinhole or it can be coupled to a single-mode optical fiber. However, both of these schemes lead to a significant loss in power, i.e. they are not energy efficient.

SUMMARY

In order to improve on prior art solutions there is provided, according to a first aspect, an arrangement for processing incoming incoherent electromagnetic radiation, said incoming incoherent electromagnetic radiation comprising radiation in a first wavelength interval. The arrangement comprises a focusing arrangement for focusing the incoming incoherent electromagnetic radiation, a first cavity configured to comprise an intra cavity laser beam, a nonlinear crystal arranged in the first cavity such that it is capable of receiving the focused incoherent electromagnetic radiation and, in dependence on the spatial overlap between the focused incoherent electromagnetic radiation and the intra-cavity laser beam, by interaction with the intra-cavity laser beam provide processed electromagnetic radiation, said processed electromagnetic radiation comprising radiation in a second wavelength interval.

In other words, such an arrangement is capable of enabling imaging, e.g. by utilizing a detector that is sensitive in the second wavelength interval, a source of radiation that emits or reflects incoherent light in a first wavelength interval.

Embodiments include those that comprise a scan unit configured such that it is capable of spatial scanning of incoherent light emanating from an extended light source and conveying the scanned incoherent light to the focusing arrangement.

Embodiments include those that comprise a single mode fibre probe and a lens for collecting incoherent light from inside an extended light source.

These are simple ways in which radiation from an extended object can be provided to the nonlinear crystal where the interaction with the intra cavity laser beam takes place.

The arrangement may be configured such that the first cavity is capable of receiving laser energy from a laser source operating in, e.g., a continuous wave mode or a pulsed mode, outside the first cavity. This configuration provides a possibility to generate a high intracavity field inside the first cavity at all frequencies supported by any laser media. This includes particularly the important class of diode lasers. The technique used is called "frequency locking" of a laser to an external cavity. Frequency locking often involves an electronic stabilization unit. Diode lasers are beneficial since they can be designed for operation at a specific wavelength within in a broad wavelength region. The wavelength flexibility can be used to facilitate a specific transformation between the first and second wavelength range.

The arrangement may be configured such that the first cavity comprises a lasant medium and a pump source for pumping said lasant medium, the pump source operating in, e.g., a continuous wave mode or a pulsed mode. In this case the lasant medium passively locks itself to the cavity which circumvent any need for active stabilization.

For example, the lasant medium may be of the type solid state, semiconductor, gas or liquid, and the pumping source may be a flash lamp, semiconductor laser, solid state laser, light emitting diode or current.

The non-linear crystal may be phase matched to optimize the conversion of incoming electromagnetic radiation in a first wavelength interval to the processed radiation in the second wavelength interval. In order to obtain a good interaction between the incoming radiation and the intra cavity beam to the processed radiation phase matching (PM) or quasi phase matching (QPM) is required. If phase matching or quasi phase matching is not fulfilled, the generation of the processed radiation will essentially cancel due to destructive interference as the incoming radiations propagates through the nonlinear crystal.

The nonlinear crystal may be configured to be tuned for obtaining phase matching. This can be accomplished using angle tuning of the nonlinear crystal, by applying temperature or pressure to crystal or through quasi phase matching.

The nonlinear crystal may be configured to be poled for obtaining phase matching. This is method is referred to as quasi phase matching. By (synthetically) changing the direction of the polarization of the dipole moment of the nonlinear crystal periodically, quasi phase matching can be obtained. The periodicity is specific to the interaction at hand. Two nonlinear crystals often used for quasi phase matching is PP KTP and PP LiNbO$_3$, The nonlinear crystal may be configured to be poled in a fanned or chirped manner. The fanning implies that the periodicity of the poled crystal is different at different transverse positions in the crystal. Thus by translating the non-linear crystal transversely with respect to the incoming radiation (or vice versa), different wavelength components of the incoming radiation can be quasi phase matched, thus efficiently processed. The poling may also include a chirped structure leading to broad spectral acceptance.

The nonlinear crystal may be a Brewster cut. This is advantageous since it solves a practical problem that arises from the fact that three different wavelengths are involved, i.e. the wavelength of the incoming radiation, the wavelength of the intra cavity beam and the wavelength of the processed beam. It is difficult and expensive to manufacture dielectric coatings that can act as an antireflexion coating at all three wavelengths. However if the nonlinear crystal is Brewster cut, p-polarized will essentially be transmitted loss-less (or with very low loss), thereby elevating the need for coatings at the end surfaces. When using quasi phase matching all the three mentioned radiation fields can be p-polarized. Thus periodically poled crystals with Brewster cut ends are particularly advantageous.

The arrangement may be configured such that the interaction between the incoming electromagnetic radiation and the intra cavity beam comprises any one of difference frequency generation, DFG, sum frequency generation, SFG and any combination thereof. SFG and DFG constitute the underlying physical mechanism that allows processing of incoming radiation as described herein.

That is, the shortest wavelength of the second wavelength interval may be shorter than the shortest wavelength of said first wavelength interval. For example, the first wavelength interval may be an infrared wavelength interval and the second wavelength interval may be a visual wavelength interval, or the first wavelength interval may be a mid infrared wavelength interval and the second wavelength interval may be a near infrared wavelength interval. The longest wavelength of the second wavelength interval may be longer than the longest wavelength of said first wavelength interval. For example, the first wavelength interval may be an ultraviolet wavelength interval and the second wavelength interval may be a visual wavelength interval.

The first cavity may be a unidirectional ring cavity. In order to optimize the generation of the processed radiation, a very high intensity intra cavity beam is typically needed. The cavity which supports the intra cavity beam often comprises two or more mirrors aligned so as to form a standing wave cavity. A standing wave cavity is characterized by supporting a beam that propagates back and forth forming a standing wave. When a lasant medium is located in the cavity, "spatial hole burning" occurs. Spatial hole burning leads to secondary lasing emission characterized by emitting new wavelengths. Due to a lack of good phase matching of this (or these) new secondary mode(s), the overall efficiency of the SFG or DFG of interaction is reduced. In contrast to a standing wave cavity, the unidirectional ring cavity support a traveling wave which does not lead to standing wave formation and thus spatial hole burning. The unidirectional ring cavity will thus be able to accommodate an intense intra cavity beam leading to high interaction efficiency.

The first cavity may comprise a frequency selective element for narrowing the bandwidth of the intra cavity beam. This approach also has the purpose of reducing the formation of secondary lasing modes in a standing wave cavity. Typical frequency selective elements are etalons, Lyot filters, gratings and birefringent prism.

In a second aspect there is provided a method for processing incoming incoherent electromagnetic radiation, said incoming incoherent electromagnetic radiation comprising light in a first wavelength interval. The method comprises focusing the incoming incoherent electromagnetic radiation, maintaining an intra-cavity laser beam in a first cavity, receiving the focused incoherent electromagnetic radiation in a nonlinear crystal arranged in the first cavity and, in dependence on the spatial overlap between the focused incoherent electromagnetic radiation and the intra-cavity laser beam, by interaction with the intra-cavity laser beam providing a processed beam of electromagnetic radiation, said processed beam of electromagnetic radiation comprising radiation in a second wavelength interval.

As for the first aspect, such a method is capable of enabling imaging, e.g. by utilizing a detector that is sensitive in the second wavelength interval, a source of radiation that emits or reflects incoherent light in a first wavelength interval.

Use of an arrangement as summarized above in relation to the first aspect is a third aspect that provides large advantages when analyzing a sample from which the incoming light emanates. For example, molecular absorption bands as well as emission bands can be analyzed for gases such as $CH_4$, CO, $CO_2$, HCl, $H_2S$, $NH_3$, NO, $N_2O$, $NO_2$, $SO_2$, water vapor, CFC and HFC.

According to a fourth aspect, an arrangement is provided for processing incoming electromagnetic radiation, said incoming electromagnetic radiation comprising radiation in a first wavelength interval and a plurality of spatial frequencies. The arrangement comprises a focusing arrangement for focusing the incoming electromagnetic radiation, a first cavity configured to comprise an intra cavity laser beam, a nonlinear crystal arranged in the first cavity such that it is capable of receiving the focused electromagnetic radiation and, in dependence on the spatial overlap between the focused electromagnetic radiation and the intra-cavity laser beam, by interaction with the intra-cavity laser beam provide processed electromagnetic radiation, said processed electromagnetic radiation comprising radiation in a second wavelength interval and at least a subset of said plurality of spatial frequencies.

In other words, such an arrangement is capable of enabling imaging, e.g. by utilizing a detector that is sensitive in the second wavelength interval, a source of radiation that emits in a first wavelength interval and comprising several spatial frequencies. Furthermore, such arrangement is capable of improving the spatial quality of the incoming radiation.

The arrangement may be configured such that the first cavity is capable of receiving laser energy from a laser source outside the first cavity. This configuration provides a possibility to generate a high intracavity field inside the first cavity at all frequencies supported by any laser media. This includes particularly the important class of diode lasers. The technique used is called "frequency locking" of a laser to an external cavity. Frequency locking often involves an electronic stabilization unit. Diode lasers are beneficial since they can be designed for operation at a specific wavelength within in a broad wavelength region. The wavelength flexibility can be used to facilitate a specific transformation between the first and second wavelength range.

The arrangement may be configured such that the first cavity comprises a lasant medium and a pump source for pumping said lasant medium. In this case the lasant medium passively locks itself to the cavity which circumvent any need for active stabilization.

For example, the lasant medium may be of the type solid state, semiconductor, gas or liquid, and the pumping source may be a flash lamp, semiconductor laser, solid state laser, light emitting diode or current.

The arrangement may be configured to focus and process incoming electromagnetic radiation that comprises any one of coherent radiation, incoherent radiation and a combination of coherent and incoherent radiation. Coherent illumination usual involves a laser or emission from a narrow band light source for illumination of an object. Typical applications of coherent illumination are for holography, speckle inteferometry or confocal microscopy. Incoherent illumination is employing polychomatic light for illumination, e.g. sun light.

A typical example is usual pocket cameras that capture light from incoherently illuminated objects.

The focusing arrangement may be configured to perform an optical Fourier transform of the incoming electromagnetic radiation. Such a configuration will insure that the different spatial frequency components of the incoming radiation are spatially displaced from the optical axis of the system. Thus the higher the spatial frequency of the incoming radiation the more transversely displaced it will be. In consequence the spatial overlap between the intracavity beam and the incoming electromagnetic radiation can be controlled easily.

The arrangement may be configured such that the transverse dimension of the focused incoming electromagnetic radiation is adjusted relatively to the transverse dimension of the intra cavity laser beam so as to suppress at least a subset of said plurality of spatial frequencies of the incoming electromagnetic radiation. In such a configuration the incoming electromagnetic radiation is effectively low pass filtered. This configuration can be used for removal of unwanted spatial components of the incoming radiation. An example is "beam clean-up", where essentially only the lowest order spatial component is wanted, i.e. the Gaussian intensity profile.

The arrangement may be configured such that the transverse dimension of the focused incoming electromagnetic radiation is smaller than the transverse dimension of the intra cavity laser beam so that at least a subset of said plurality of spatial frequencies of the incoming electromagnetic radiation is overlapping the intra cavity beam. In such cases, essentially all the spatial frequencies of the incoming radiation is processed (through sum or frequency generation) and a good upconveted image can be produced.

The non-linear crystal may be phase matched to optimize the conversion of incoming electromagnetic radiation in a first wavelength interval to the processed radiation in the second wavelength interval. In order to obtain a good interaction between the incoming radiation and the intra cavity beam to the processed radiation phase matching (QM) or quasi phase matching (QPM) is required. If phase matching or quasi phase matching is not fulfilled, the generation of the processed radiation will essentially cancel due to destructive interference as the incoming radiations propagates through the nonlinear crystal.

The nonlinear crystal may be configured to be tuned for obtaining phase matching. This can be accomplished using angle tuning of the nonlinear crystal, by applying temperature or pressure to crystal or through quasi phase matching.

The nonlinear crystal may be configured to be poled for obtaining phase matching. This is method is referred to as quasi phase matching. By (synthetically) changing the direction of the polarization of the dipole moment of the nonlinear crystal periodically, quasi phase matching can be obtained. The periodicity is specific to the interaction at hand. Two nonlinear crystals often used for quasi phase matching is PP KTP and PP LiNbO$_3$, The nonlinear crystal may be configured to be poled in a fanned manner. The fanning implies that the periodicity of the poled crystal is different at different transverse positions in the crystal. Thus by translating the nonlinear crystal transversely with respect to the incoming radiation, different wavelength components of the incoming radiation can be quasi phase matched, thus efficiently processed.

The nonlinear crystal may be a Brewster cut. This is advantageous since it solves a practical problem that arises from the fact that three different wavelengths are involved, i.e. the wavelength of the incoming radiation, the wavelength of the intra cavity beam and the wavelength of the processed beam. It is difficult and expensive to manufacture dielectric coatings that can act as an antireflexion coating at all three wavelengths. However if the nonlinear crystal is Brewster cut, p-polarized will essentially be transmitted loss-less (or with very low loss), thereby elevating the need for coatings at the end surfaces. When using quasi phase matching all the three mentioned radiation fields can be p-polarized. Thus periodically poled crystals with Brewster cut ends are particularly advantageous.

The arrangement may be configured such that the interaction between the incoming electromagnetic radiation and the intra cavity beam comprises any one of difference frequency generation, DFG, sum frequency generation, SFG and any combination thereof. SFG and DFG constitute the underlying physical mechanism that allows processing of incoming radiation as described herein.

That is, the shortest wavelength of the second wavelength interval may be shorter than the shortest wavelength of said first wavelength interval. For example, the first wavelength interval may be an infrared wavelength interval and the second wavelength interval may be a visual wavelength interval, or the first wavelength interval may be a mid infrared wavelength interval and the second wavelength interval may be a near infrared wavelength interval. The longest wavelength of the second wavelength interval may be longer than the longest wavelength of said first wavelength interval. For example, the first wavelength interval may be an ultraviolet wavelength interval and the second wavelength interval may be a visual wavelength interval.

The first cavity may be a unidirectional ring cavity. In order to optimize the generation of the processed radiation, a very high intensity intra cavity beam is typically needed. The cavity which supports the intra cavity beam often comprises two or more mirrors aligned so as to form a standing wave cavity. A standing wave cavity is characterized by supporting a beam that propagates back and forth forming a standing wave. When a lasant medium is located in the cavity, "spatial hole burning" occurs. Spatial hole burning leads to secondary lasing emission characterized by emitting new wavelengths. Due to a lack of good phase matching of this (or these) new secondary mode(s), the overall efficiency of the SFG or DFG of interaction is reduced. In contrast to a standing wave cavity, the unidirectional ring cavity support a traveling wave which does not lead to standing wave formation and thus spatial hole burning. The unidirectional ring cavity will thus be able to accommodate an intense intra cavity beam leading to high interaction efficiency.

The first cavity may comprise a frequency selective element for narrowing the bandwidth of the intra cavity beam. This approach also has the purpose of reducing the formation of secondary lasing modes in a standing wave cavity. Typical frequency selective elements are etalons, Lyot filters, gratings and birefringent prism.

In a fifth aspect there is provided a method for processing incoming electromagnetic radiation, said incoming electromagnetic radiation comprising light in a first wavelength interval and a plurality of spatial frequencies. The method comprises focusing the incoming electromagnetic radiation, maintaining an intra-cavity laser beam in a first cavity, receiving the focused electromagnetic radiation in a nonlinear crystal arranged in the first cavity and, in dependence on the spatial overlap between the focused electromagnetic radiation and the intra-cavity laser beam, by interaction with the intra-cavity laser beam providing a processed beam of electromagnetic radiation, said processed beam of electromagnetic radiation comprising radiation in a second wavelength interval and at least a subset of said plurality of spatial frequencies.

As for the fourth aspect, such a method is capable of enabling imaging, e.g. by utilizing a detector that is sensitive in the second wavelength interval, a source of radiation that emits in a first wavelength interval and comprising several spatial frequencies. Furthermore, improving the spatial quality of the incoming radiation is also enabled.

Use of an arrangement as summarized above in relation to the fourth aspect is a sixth aspect that provides large advantages when analyzing a sample from which the incoming beam of light emanates. For example, molecular absorption bands as well as emission bands can be analyzed for gases such as $CH_4$, CO, $CO_2$, HCl, $H_2S$, $NH_3$, NO, $N_2O$, $NO_2$, $SO_2$, water vapor, CFC and HFC.

BRIEF DESCRIPTION OF THE DRAWINGS

Embodiments will now be described with reference to the attached drawings, where:

FIG. 3a is a photograph of a transmission mask, FIG. 3b is a photograph of an object image, FIG. 3c is a photograph of a processed object image, FIGS. 4a and 4b are diagrams showing intensity levels of the images in FIG. 3b and FIG. 3c, respectively, FIGS. 9a and 9b are diagrams of $M^2$ measurements, FIGS. 10a-c are diagrams showing intensity values for cross-sections of laser beams, FIGS. 11a-d are photographs intensity distributions of laser beams, FIG. 12 is a diagram illustrating energy conversion efficiency, FIG. 13 schematically illustrates a third arrangement for processing electromagnetic radiation.

DETAILED DESCRIPTION OF EMBODIMENTS

An efficient way to transform light from one part of the spectrum into a new desired part is by using sum frequency generation (SFG). An apparatus will be described in detail below where two solid state lasers at 1064 nm and 1342 nm respectively are mixed in a PP:KTP crystal located in the intense intra-cavity field of the 1342 nm laser cavity. This resulted in more than 700 mW of SFG, yellow light. In another apparatus, a solid state laser at 1342 nm and a tapered diode laser at 765 nm are mixed to generate more than 300 mW of 488 nm light, corresponding to a power conversion efficiency from 765 nm to 488 nm of 32%.

It will also be shown that a non-Gaussian tapered diode laser beam can be spatially filtered using SFG with a Gaussian solid state laser beam to produce a SFG beam with nearly Gaussian profile. The filtering characteristics depend on the spatial overlap in the focus plane of the two interacting beams. If the non Gaussian tapered diode beam is focused to a diameter where only its fundamental Gaussian spatial component overlaps the Gaussian beam of the solid state laser, it is possible to obtain an almost Gaussian SFG beam. Similarly if hard focusing is utilized all the detailed spatial features of the tapered diode laser beam will appear in the SFG beam.

If the input beam in reality is an image, comprising several spatial frequencies, not necessarily a near Gaussian laser beam, it will be described that it is possible, efficiently to transform an image at one wavelength into a new wavelength with high conversion efficiency. The basic principle of imaging conversion by nonlinear conversion is exemplified in the following.

One interesting feature of the described arrangements and methods is its promise to circumvent an important limitation to already existing mid-IR spectroscopy, namely the lack of efficient mid-IR detector systems. Using the suggested method also mid-IR radiation can conveniently be up-converted to the NIR region for efficient Si-based detection. It is expect that the sensitivity can be increased roughly by a factor of 100 as compared to the best scientific results published, or by 8 orders of magnitude as compared to room temperature systems.

Figure 1:
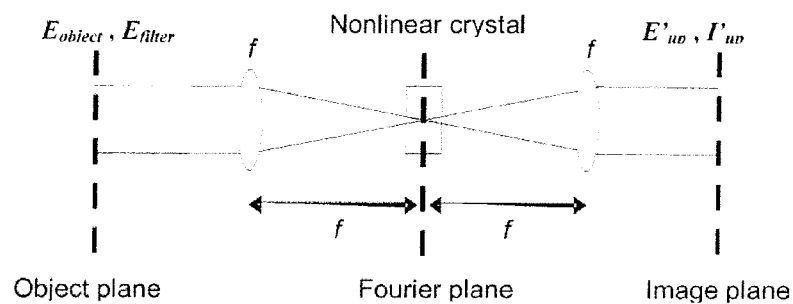
FIG. 1 schematically illustrates an optical system.

In the following we will derive an expression for the intensity profile of an up-converted object field, $E_{object}=E_{object}(x,y)$ where x and y denotes the transverse coordinates of the field. The up-converted image, $E_{up}=E_{up}(x,y)$ will be a result of a SFG process between $E_{object}$ and a Gaussian intra-cavity field, $U_{Gauss}=U_{Gauss}(u,v)$, where u and v are the transverse coordinates at the Fourier plane. The specific system under consideration is shown in FIG. 1. We will assume that the object field is subject to coherent monochromatic illumination [Introduction to Fourier Optics, Joseph W. Goodman, third edition (2005)]. For simplicity we will assume that the system is operated in the non-saturated regime. This assumption implies that the amplitudes of the generating fields, $E_{object}$ and $U_{Gauss}$ can be approximated as being constant throughout the entire interaction length of the nonlinear crystal. Further a plane wave approximation is used and finally that the length of the crystal is short compared to the confocal length. All these assumptions are not necessary, but allow us to derive a simple relation between the light emitted from the object and the corresponding up-converted image at the image plane.

According to the Fourier optics theory [Introduction to Fourier Optics, Joseph W. Goodman, third edition (2005)], the electric field distribution, $U_{FP}$ at the Fourier plane is given by:

$$U_{FP}(u,v) = j\lambda_1 f F\{E_{object}(f\lambda_1 x, f\lambda_1 y)\}$$

where:
$\lambda_1$ is the wavelength of light emitted from the object,
f is focal length of the Fourier transforming lens,
F is the two dimensional Fourier transform The electric field distribution, $U_{Gauss}$ of the intra cavity beam (of wavelength $\lambda_2$) at the Fourier plane is given by:

$$U_{Gauss}(u,v) = U_0 e^{-\frac{u^2+v^2}{w_0^2}},$$

$$U_0 = \sqrt{\frac{4P_{Gauss}}{\pi n_2 \varepsilon_0 c w_0^2}}$$

where:
$P_{Gauss}$ is the power of the Gaussian electric field,
$n_2$ is the refractive index corresponding to $\lambda_2$,
$\varepsilon_0$ is the vacuum permeability,
c is the speed of light, and
$w_0$ is the radius at the beam waist The nonlinear interaction gives rise to a SFG field, $U_{SFG}$ of wavelength $\lambda_3$ at the Fourier plane. $U_{SFG}$ is given by [Introduction to Fourier Optics, Joseph W. Goodman, third edition (2005)]:

$$U_{SFG}(u,v) = -j\frac{2\pi d_{eff} L}{n_3 \lambda_3} U_{FP}(u,v) U_{Gauss}(u,v)$$

where:
$d_{eff}$ is the effective nonlinearity of the crystal,
L is the length of the crystal,
$\lambda_1$ is the wavelength of the object field,
$n_3$ is the refractive index corresponding to $\lambda_3$, and
$n_1$, $n_2$ and $n_3$ are the refractive index corresponding at $\lambda_1$, $\lambda_2$ and $\lambda_3$.
$\lambda_3$ is determined by:

$$\frac{1}{\lambda_3} = \frac{1}{\lambda_1} + \frac{1}{\lambda_2}$$

where $\lambda_2$ is the wavelength of the intra-cavity beam.

At the image plane the image, $E_{up}$ of $U_{SFG}$ is given by:

$$E_{up}(x,y) = -j\lambda_3 f_1 F\{U_{SFG}(\lambda_3 f_1 u, \lambda_3 f_1 v)\}$$

or $$E_{up}(x,y) = j\frac{2\pi^2 d_{eff} L \lambda_1 f w_0^2}{n_3 f_1^3 \lambda_3^4} U_0 E_{object}\left(-\frac{\lambda_1 f}{\lambda_3 f_1}x, -\frac{\lambda_1 f}{\lambda_3 f_1}y\right) \otimes e^{-\frac{x^2+y^2}{\left(\frac{\lambda_3 f_1}{\pi w_0}\right)^2}}$$

where $f_1$ is the focal length of the Fourier transforming lens.

For the intensity profile $I_{up}$:

$$I_{up}(x,y) = \frac{8\pi^3 d_{eff}^2 f^2 \lambda_1^2 L^2 w_0^2}{n_2 n_3 f_1^6 \lambda_3^8} P_{Gauss} \left| E_{object}\left(-\frac{\lambda_1 f}{\lambda_3 f_1}x, -\frac{\lambda_1 f}{\lambda_3 f_1}y\right) \otimes e^{-\frac{x^2+y^2}{\left(\frac{\lambda_3 f_1}{\pi w_0}\right)^2}} \right|^2$$

This expression shows that a spatial filtering between the object field and the Gaussian field is taking place. We note that this expression is a generalization of the usual nonlinear theory [Parametric Interaction of Focussed Gaussian Light Beams, G. D. Boyd and D. A. Kleinman, J. of Applied Physics, Vol. 39, no. 8, pg. 3597-3641 (1968)], where Gaussian beams are involved. In the limit where the beam diameter $w_0$ becomes sufficiently large:

$$I_{up}(x,y) = \frac{16\pi d_{eff}^2 f^2 \lambda_1^2 L^2}{n_1 n_2 n_3 c \varepsilon_0 f_1^4 \lambda_3^4 w_0^2} P_{Gauss} I_{object}\left(-\frac{\lambda_1 f}{\lambda_3 f_1}x, -\frac{\lambda_1 f}{\lambda_3 f_1}y\right)$$

In this case a perfect up-converted image can be obtained, scaled with a factor:

$$-\frac{\lambda_3 f_1}{\lambda_1 f}.$$

In this If the spatial diameter of $E_{filter}$, e.g. defined as $1/e^2$ level, is much wider than the spatial features of the object, the object $E_{object}$ is effectively low pass filtered. This has been used for beam clean up of a non-Gaussian beam. In the derivation we have for simplicity referred to a specific set-up as shown in FIG. 1. However, the conclusions remain valid under more general conditions. For example, if an arbitrary number of lenses are arranged to transform the incoherent light source from the object plane to form an image at the image plane, an up-converted image will also be generated even though the non-linear medium is not located at any Fourier plane—provided that the spatial components of the incoming light is essentially within the Gaussian envelope of the intra-cavity beam at the position of the nonlinear crystal (and no depletion of the involved fields takes place). Besides conceptual simplicity of the set-up described in FIG. 1, a special feature of situating the crystal in the Fourier plane is when filtering is wanted. In the Fourier plane the spatial frequencies of the incoming light is separated the most. Thus providing the best filtering plane. In this derivation we have not included the acceptance parameters of the non-linear process. The angular acceptance parameter of the specific SFG process will act as a filter limiting the resolution for a given set-up. The spectral acceptance parameter defines the spectral width of frequencies that can be up-converted for a specific set-up. Several methods can be used to elevate these limitations. In relation to the derivation above, we note in particularly that under incoherently illumination, our main conclusions remain intact, but emphasize that only light frequencies that fulfills the spectral phase match condition will be efficiently up-converted. Thus, the arrangement described here will act as a spectral filter. Below it will be described a method for scanning said phase match condition, thus the center frequency of the filter.

Figure 2:
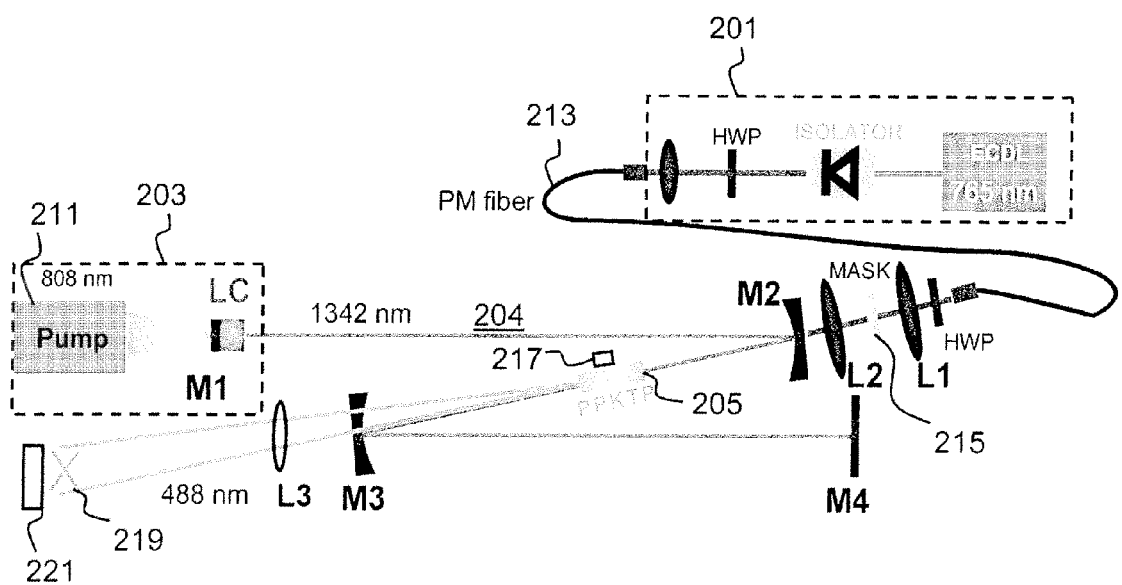
FIG. 2 schematically illustrates a first arrangement for processing electromagnetic radiation.

A first example of an apparatus in which electromagnetic radiation is processed is shown in FIG. 2. It comprises a single-frequency 765 nm external-cavity tapered diode laser 201, a high finesse, Z-shaped 1342 nm solid-state laser 203 that together with mirrors M1, M2, M3 and M3 forms a laser cavity 204, and an intra-cavity PP:KTP crystal 205. Characteristics of the 1342 nm laser 203 are described in further detail below with reference to FIG. 7. The beam waist for the PP:KTP crystal 205 is located approximately 60 mm from mirror, M2 and the size of the beam waist is 70 μm, ignoring a slight astigmatism arising from the tilted mirrors, M2 and M3 as well as from the passage of Brewster cut surfaces of the PP:KTP crystal 205.

The intra-cavity power of the 1342 nm laser 203 is measured to be around 120 W when the laser crystal (LC) is pumped with 2 W of 808 nm light from a laser pump 211.

The 765 nm tapered diode laser 201 is coupled to a single-mode polarization maintaining fiber 213. The Gaussian output beam from the fiber 213 is collimated by a lens L1 (f=100 mm) to a beam diameter of approximately 10 mm. This beam is used for coherent illumination of a transmission mask 215 to form an object beam $E_{object}$ (see FIG. 3b). The two slits forming a cross is 1 mm by 5 mm in width. Some minor diffraction effects appear in the transmitted image as can be seen in FIG. 3b. The 765 nm object is transformed by a lens L2 with f=100 mm in combination with curved mirror M2 (f=−50 mm) to the Fourier plane inside the PP:KTP crystal 205. The PP:KTP crystal 205 is placed at the beam Waist of the 1342 nm cavity 204.

The 10 mm long Brewster cut PPKTP crystal 205 is temperature controlled using a Peltier element 217. The temperature is set to 43.5° C. to facilitate optimum quasi-phase matching for sum frequency generation between the 1342 nm beam and the object beam at 765 nm. Finally the up-converted object beam is collimated by a 200 mm lens L3 to form the up-converted image 219 at 488 nm.

FIG. 3a shows the transmission mask 215 that is coherently illuminated by the 765 nm collimated external cavity laser 201. The emitted light after passage of the mask 215, corresponding to $E_{object}$, is shown in FIG. 3b. The Fourier transform of the object field $E_{object}$ is performed using a +100 mm lens L1 placed 80 mm from the object plane and 62 mm from mirror M2. Mirror M2 acts as a negative lens, f=−50 mm due to its radius of curvature. At the position of the beam waist inside the PP:KTP crystal 205 the high intra-cavity field of the 1342 nm laser 203 and the Fourier transformed object field interacts through SFG to generate a blue, 488 nm up-converted image 219. This is shown in FIG. 3c. FIGS. 4a and 4b show the corresponding CCD images, i.e. FIG. 4a shows the object image corresponding to FIG. 3b and FIG. 4b shows the object image corresponding to FIG. 3c.

Figure 5:
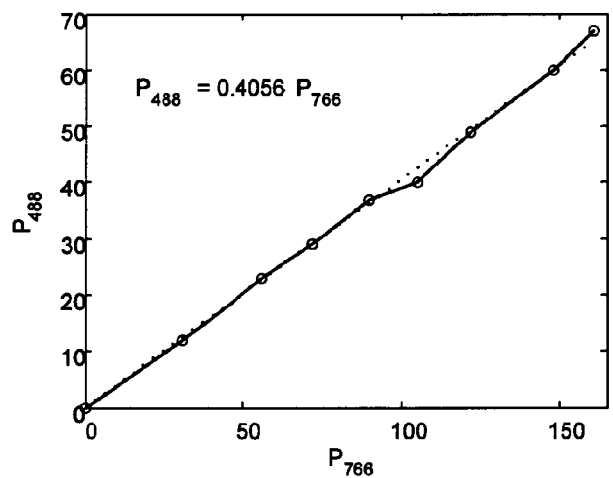
FIG. 5 is a diagram illustrating energy conversion efficiency.

The image at 765 nm (FIGS. 3b and 4a) contains more noise since the sensitivity of the camera used to record the pictures is far less sensitive to infrared than to visible light. A camera is schematically illustrated by reference numeral 221. Time of exposure is increased approximately 100 times for the 765 nm recording (FIGS. 3b and 4a). However it can clearly be seen that the blue upconverted image (FIGS. 3c and 4b) resembles the original object field (FIGS. 3b and 4a). The power transmitted through the mask 215 is 15 mW and the blue image contained 6 mW of power. We have thus obtained 40% efficiency in the up-conversion process. To our best knowledge, this is the highest up-conversion efficiency reported. This is illustrated in further detail in a graph in FIG. 5. FIG. 5 shows discrete experimental results and a fitted linear curve of the 488 nm power as a function of the incident 765 nm power without any transmission mask inserted. As can be seen, the conversion efficiency from 765 nm to 488 nm is indeed 40%. The circulating 1342 nm power was 120 W for all experiments. This experimental situation corresponds to $\eta_{SUM}$=0.003 $W^{-1}$. A very attractive feature is the linearity between incident and up-converted light which means that also very weak object images can be efficiently up-converted. This is in strong contrast to Second Harmonic Generation (SHG).

Figure 6A:
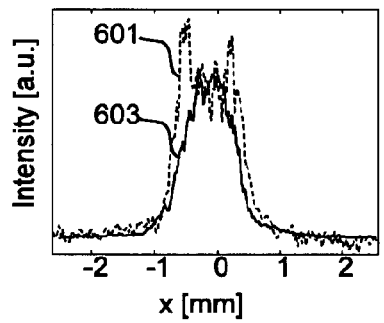
FIGS. 6a-d are diagrams showing intensity values for cross-sections of laser beams and corresponding calculated profiles, FIG. 7 schematically illustrates a second arrangement for processing electromagnetic radiation.
Figure 6B:
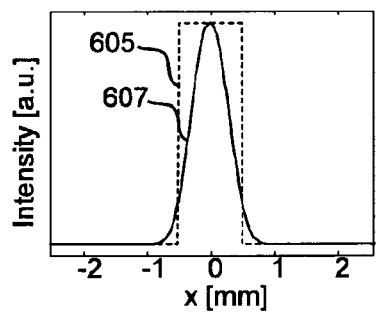
Figure 6C:
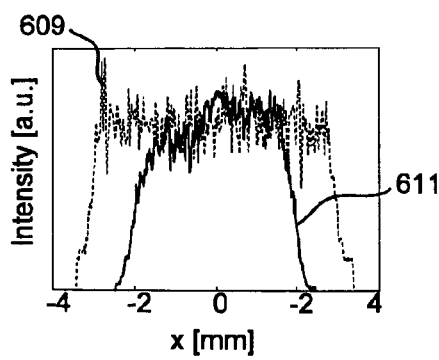
Figure 6D:
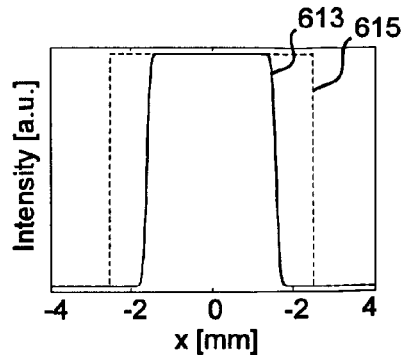

FIGS. 6a and 6c show a cross section of the 765 object beam 601,609 and the corresponding 488 nm up-converted image 603,611 at the image plane. FIGS. 6b and 6d show the calculated intensity profiles corresponding to FIGS. 6a and 6c respectively. FIG. 6b shows, the cross section of the 765 nm coherently illuminated object radiation passing the 1 mm wide slit as it appears in the image plane 605. Using the theory outlined the up-converted 488 nm image at the image plane is shown as 607. When comparing with the experimentally obtained intensity profiles 601, 603 a relatively good match is found. FIG. 6d shows the same features 613,615 but corresponding to the 5 mm width of the cross.

The converted image in FIG. 3c is not sharp due to different types of distortion. For example, the coupling concave mirror M2 acts as a negative lens and induces astigmatism in the infrared beam due to angled incidence. Another effect seen in the blue image is the spatial filtering. The 1342 nm beam has a Gaussian profile and attenuates the high-frequency components of the image. The visible image has therefore no sharp edges. Larger 1342 nm beam profile or harder focusing of the infrared beam would improve the quality (resolution) of the reproduction. The picture in FIG. 3c is saturated—in reality it looks better. In addition to this, the visible light is generated throughout the nonlinear crystal and not in the focal plane only. All this contributes to the image distortion as shown in FIG. 3c.

The use of Brewster cut nonlinear materials, i.e. crystal 205, allows for low-loss coupling in and out of the nonlinear material. Furthermore, the different index of refraction at the generated field compared to the fundamental fields allows for the generated beam to bypass the mirrors of the diode pumped solid-state laser (DSSL) resonator in the laser 203, resulting in a significant reduction in the constraints of the mirror coatings, which could be a problem considering tuning ranges in the mid-IR of more than 1 µm.

Although the apparatus described above involves the use of electromagnetic radiation in the infrared wavelengths, the apparatus may be used in other wavelength intervals. That is, instead of converting radiation from the IR or MIR to the visible or NIR, it is possible to use the same scheme to convert UV light down to the visible wavelength region, i.e. the region where standard Si detectors have high sensitivity. Typically Si detectors become highly insensitive when the incoming wavelength is below 300 nm. With availability of laser crystals which make possible a high circulating field at around 300-400 nm, UV light can be converted so as to fall in the zone of operation of the Si detectors. To increase the sensitivity of Si detectors to UV light, back-illuminated chips have been developed. These detectors increase tremendously the sensitivity, but demand a relatively expensive technology and still reach only limited spectral bandwidth.

The converted image may be projected on a conventional Si-based high-speed camera. Thus, the presented technique offers potentially high-speed detector in the MIR region of the spectrum, since the wavelength conversion is practically instantaneous. There is also no need to cool the detector, and there are no moving mechanical parts.

Now, with regard to improving the quality of a laser beam having a plurality of spatial frequencies, an experimental realization of nonlinear beam clean-up is presented in the following, where the main features of the generated beam are measured as a function of the size and quality of the single-pass 765 nm beam. We generate approximately 300 mW of 488 nm light with a good beam quality of $M^2$=1.25 by mixing a high quality beam at 1342 nm with a lower quality beam at 765 nm.

Figure 7:
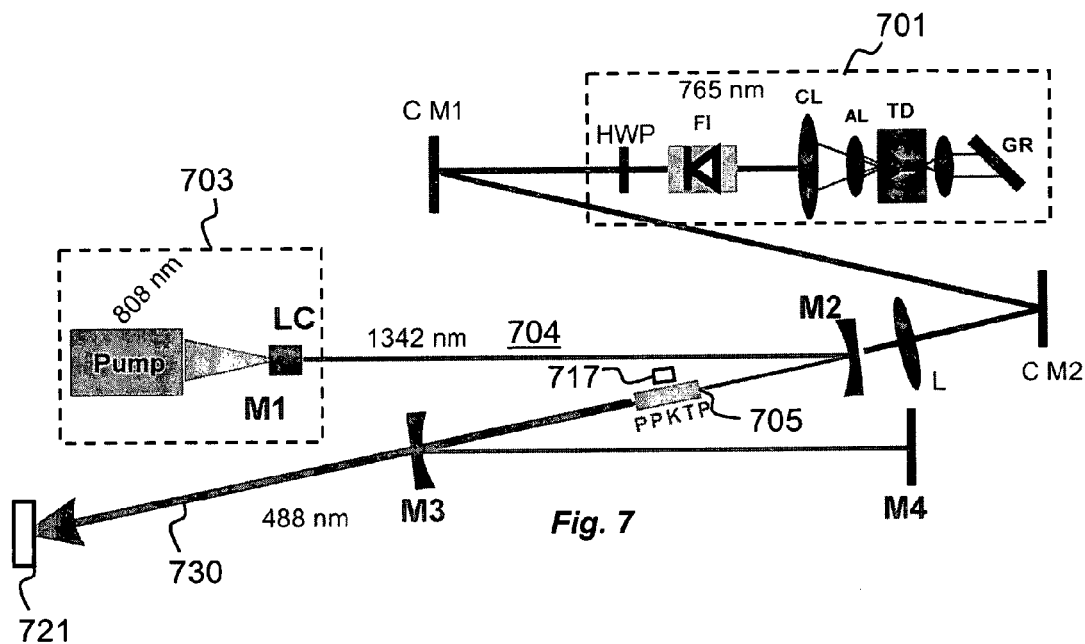

The apparatus used is similar to the apparatus described above in connection with FIG. 2, and it is shown in FIG. 7. The apparatus comprises an external cavity tapered diode laser 701 oscillating at 765 nm and a 1342 nm Nd:YVO4 laser 703 in a Z-shaped high finesse cavity 704 with an intra-cavity periodically poled KTP (PPKTP) crystal 705 for SFG.

The 1342 nm solid-state laser 703 comprises an 8 mm long a-cut Nd:YVO4 crystal LC with a Nd-doping of 0.5 atm %. The high-finesse cavity 704 is formed by four mirrors: M1 (plane end surface of the laser crystal), M2 (r=−100 mm), M3 (r=−150 mm) and a plane mirror M4. M1 is coated for high reflection at 1342 nm and high transmission at 808 nm. Mirrors M2, M3 and M4 are coated for high reflection at 1342 nm and high transmission at 765 nm. The distance between M1 and M2 is 213 mm, the separation of M2 and M3 is 178 mm, and there is 248 mm between M3 and M4. The 1342 nm cavity 704 forms an approximately circular beam waist of 70 µm between mirror M2 and M3 inside the Brewster's cut PPKTP crystal 705. The beam intensity profile measured (using a detector not shown) on the beam leaking through mirror M4 is nearly Gaussian with an $M^2$ value very close to unity.

The intra-cavity losses of the 1342 nm laser 703 are calculated from slope efficiency measurements, using two plane partly reflecting (PR) mirrors (not shown) at the position of M4 (T=1.35% and T=3.5%). From these measurements, the passive round-trip loss of the 1342 nm cavity is found to be as low as $\alpha_{1342}^P = 0.6\%$.

A precise measurement of the transmission coefficient of the HR coated mirror M2 in the used configuration is made by substituting M4 with a PR mirror (T=1.35%). The 1342 nm leakage through mirror M2 is then used to calculate the circulating power in the high finesse cavity 704. Intra-cavity powers of 120 W are measured when the system is pumped with 2 W of 808 nm light when the 765 nm single-pass laser 701 is turned off.

The tapered diode laser 701 is used in a standard Littrow configuration as shown in FIG. 7. The rear surface of the AR coated tapered diode TD receives feedback from a reflective grating GR with 1800 lines/mm. This allows for single-frequency operation (sub MHz bandwidth) and tuneable output in a wavelength range of ±6 nm. The maximum output power from the ECDL 701 is 1.3 W at a drive current of 3.1 A. The output from the ECDL 701 is collimated by an aspheric lens AL and a cylindrical lens CL and passed trough a Faraday isolator FI to avoid feedback from the frequency conversion module. Mirrors CM1 and CM2 are used for beam alignment and the lens, L, focus the single-pass beam through mirror M2 into a beam waist inside the nonlinear crystal 705. Changing the focal length of the lens L from 100 to 300 mm and adjusting the position of the lens L resulted in a beam waist of 63-288 μm inside the PPKTP crystal 705. The beam-quality parameters of the tapered ECDL 701 along the horizontal and vertical axes at the position of the nonlinear crystal 705 are measured to be $M^2_H = 1.9$ and $M^2_V = 2.4$, respectively, at an output power of 1.3 W from the ECDL 701, corresponding to 1.06 W at the position of the PPKTP crystal 705, are measured.

The 10 mm long Brewster cut PPKTP crystal 705 is temperature controlled using a Peltier element 717. The optimum temperature is found to be 41.5° C. to facilitate optimum phase matching for sum-frequency generation between the 1342 nm and 765 nm beams.

The focused beam in the PPKTP crystal 705 is the Fourier transform of the ECDL 701 far-field pattern. Thus, low-frequency components are in the centre of the focus, whereas small details are at the perimeter of the beam spot. Passing a focused beam through a pinhole (hard aperture) is a well-known method for filtering of non-Gaussian beams. A similar effect is seen in sum-frequency mixing by proper choice of overlap between the Gaussian beam (soft aperture) in the laser cavity and the incoming non-Gaussian beam. It is possible to suppress the higher spatial frequency components at the perimeter of the Fourier transform of the low-quality beam so that these components do not appear in the mixed beam profile.

Four different beam waists of the single-pass laser 701 are used to investigate the effect of nonlinear beam clean-up. In the examples to be described below, the focus sizes range from approximately 63 μm to a beam waist four times larger. The smaller the beam waist, the more spatial frequency components in the low-quality beam from the single-pass laser 701 are overlapping with the Gaussian beam of the solid-state laser 703 and thus more of the higher spatial frequencies are transferred to the SFG beam 730. Using weak focusing of the single-pass beam from the single-pass laser 701, most of the higher spatial frequency components are outside the Gaussian field of the solid-state laser 703 and hence do not contribute to the nonlinear frequency conversion process. Thus, the SFG output beam 730 consists only of the mixing between the Gaussian intra-cavity beam and the Gaussian part of the low quality single-pass beam resulting in a high quality nearly Gaussian SFG output.

It is primarily the slow (vertical) axis that is analyzed in the following since this corresponds to the higher $M^2$ value of the ECDL output, thus emphasizing the nonlinear filtering. The overlap between the nearly Gaussian beam profile of the solid-state laser 703 and the 765 nm laser 701 with different focusing is shown in FIG. 8.

Figure 8A:
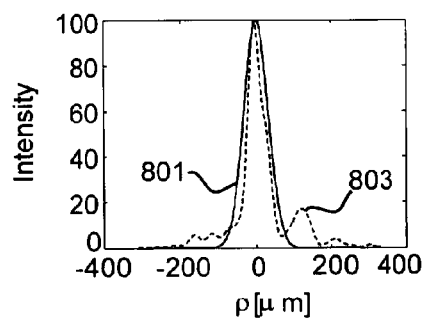
FIGS. 8a-c are diagrams showing intensity values for cross-sections of laser beams.
Figure 8B:
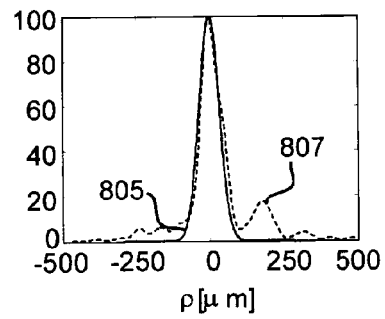
Figure 8C:
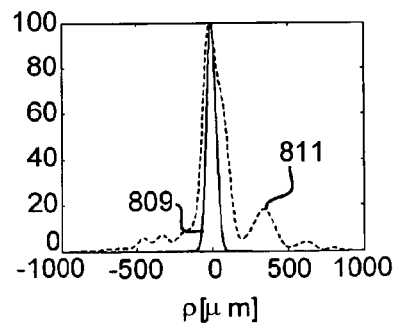

In FIGS. 8a-c the beam profile in the vertical direction of the solid state laser 703 and the 765 nm laser 703 are shown for three different focusing conditions. FIG. 8a shows the profile 801 in the vertical direction of the solid state laser 703 together with a strongly focused beam 803 from the 765 nm laser 701. FIG. 8b shows the profile 805 in the vertical direction of the solid state laser 703 together with a less strongly focused beam 807 from the 765 nm laser 701. FIG. 8c shows the profile 809 in the vertical direction of the solid state laser 703 together with a weakly focused beam 811 from the 765 nm laser 701.

It is clearly seen from FIG. 8 that the higher spatial frequency components are outside the Gaussian spot when weak focusing is applied. When stronger focusing is used, more and more of the high-frequency components falls within the Gaussian beam profile of the solid-state laser, and the beam quality of the sum-frequency generated beam approaches that of the 765 nm beam. It is, however, not possible to use focusing below 63 μm in the present configuration due to mechanical limitations. In the weak focusing limit, a collimated beam has nearly constant intensity across the area that overlaps with the 1342 nm Gaussian field so that the SFG beam becomes a replica of the 1342 nm beam.

The effect of the nonlinear beam clean-up is clearly seen from $M^2$ measurements and from far-field images of the SFG beam 730, recorded with a suitable detector 721. The $M^2$ of the SFG beam 730, along the horizontal axis and the vertical axis, versus the focus size is shown in FIGS. 9a and 9b, respectively. It is seen that the beam quality improves when the focus size increases, moving from a beam quality factor close to that of the single-pass laser at tight focusing toward a beam quality factor of approximately $M^2 = 1.25$ for weak focusing. Along the horizontal axis the beam quality is improved to $M^2 = 1.28$ following a similar trend as observed for the vertical axis.

The improved beam quality for weaker focusing is also seen from the intensity profile of the generated beam along the vertical direction as seen from FIG. 10. FIG. 10a shows the profile of the SFG 488 nm beam 730 corresponding to strong focusing of the beam from the 765 nm laser 701 (cf. FIG. 8a). FIGS. 10b and 10c show the situations for weaker focusing of the beam from the 765 nm laser 701 (cf. FIGS. 8b and 8c). Note that the measured 488 nm beam 730 is the mirror image of the input beam, as it is passed through an additional lens for analysis.

As mentioned previously the beam quality of the output from a tapered amplifier laser diode is much higher along the fast axis compared to the slow axis. Using nonlinear beam clean-up separate processing of the fast and slow axis is possible simply by different focusing, corresponding to filtering in one plane using a narrow slit. It is therefore possible to filter only one axis and focus along the other axis to optimize the nonlinear conversion efficiency.

Also the visible appearance of the SFG output strongly improves when weaker focusing is employed, as seen in the pictures of FIG. 11. FIG. 11a shows the far-field intensity distribution of the 765 nm ECDL 701. Characteristic lines are seen in the 765 nm light corresponding to higher spatial frequencies in the beam. These lines are also seen in the SFG output 730 when tight focusing is applied, as seen in FIG. 11*b*. In FIG. 11*c* the 765 nm beam waist is increased and the number of higher spatial frequencies is reduced and the beam becomes more Gaussian-like. In FIG. 11*d* the beam waist is increased further and the resulting SFG output is very close to a Gaussian beam with $M^2$ close to unity.

The conversion efficiency of sum-frequency generation is known to depend strongly on the size of the interacting fields, e.g. the conversion efficiency decreases if the beam size of the injected beam is larger than optimum and the overlap is reduced. This is also evident from FIG. 12 where the generated SFG power is shown as a function of the incoming 765 nm laser power when focused into three different beam waists of 63 μm (reference numeral 1201), 136 μm (reference numeral 1203) and 288 μm (reference numeral 1205), respectively. More than 300 mW of SFG power is obtained using tight focusing in the non-linear crystal, corresponding to a conversion efficiency of 29% from the input 765 nm power to output 488 nm power. At lower 765 nm input power, before depletion of the intra-cavity 1342 nm field, and with better beam quality of the tapered diode laser, the conversion efficiency reaches 42%.

From FIG. 12 it is clear that the improved beam quality comes at the cost of reduced frequency conversion efficiency. Using a beam waist of 136 μm the SFG output has a significantly improved beam quality and the conversion efficiency still reaches 28% resulting in SFG output power close to 300 mW. Using weaker focusing to obtain a nearly perfect Gaussian output beam the blue output power is reduced to approximately 200 mW corresponding to a 765 to 488 nm conversion efficiency of 19%.

Comparing with other means of visible light generation in the fundamental Gaussian mode, e.g. by coupling the light from the external cavity tapered diode laser into a single-mode fiber and subsequently perform the frequency conversion process with the filtered output from the single-mode fiber, the nonlinear clean-up scheme shows superior performance. The coupling efficiency from a tapered diode laser, with a beam quality as used here, to a single-mode fiber is relatively low, typically around 50%. The overall conversion efficiency of the approach based on nonlinear filtering is therefore significantly higher than what can be obtained using single-mode fiber filtering. Furthermore the complexity of the nonlinear filtering approach is far less than using fiber coupling.

Figure 13:
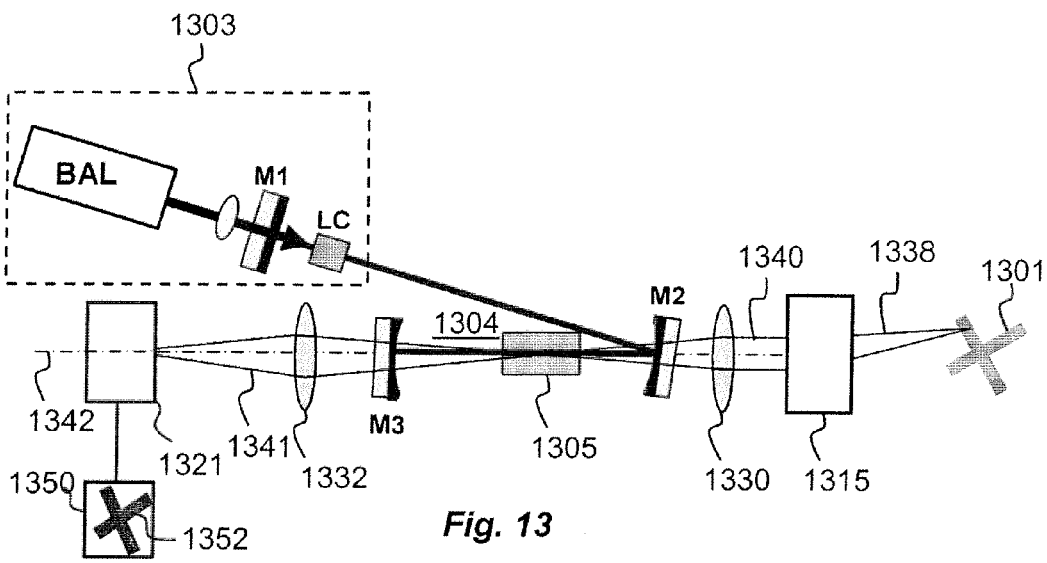

Turning now to FIG. 13, an apparatus will be described that processes incoherent light that emanates from an extended source. For example an object or sample that is illuminated by incoherent light such as sunlight or any ordinary artificial light source.

The apparatus is similar to the apparatus described above in connection with FIG. 2 and comprises a 1342 nm Nd:YVO4 laser 1303 in a Z-shaped high finesse cavity 1304 with an intra-cavity periodically poled KTP (PPKTP) crystal 1305 for sum frequency generation.

The 1342 nm solid-state laser 1303 comprises an 8 mm long a-cut Nd:YVO4 crystal LC with a Nd-doping of 0.5 atm %. The high-finesse cavity 1304 is formed by three mirrors: M1 (plane end surface of the laser crystal), M2 (r=−100 mm), M3 (r=−150 mm). M1 is coated for high reflection at 1342 nm and high transmission at 808 nm. Mirrors M2 and M3 are coated for high reflection at 1342 nm and high transmission at 765 nm. The distance between M1 and M2 is 213 mm, the separation of M2 and M3 is 178 mm. The 1342 nm cavity 1304 forms an approximately circular beam waist of 70 μm between mirror M2 and M3 inside the Brewster's cut PPKTP crystal 1305.

Lens arrangements 1330 and 1332 are arranged, together with a light scanner 1315, along a common optical axis 1342. Incoherent electromagnetic radiation 1338, emanating from a spatially extended object 1301, is conveyed by the scanner 1315 to the lens arrangement 1330 and focused inside the PPKTP crystal 1305 in the cavity 1304. The scanner 1315 is configured such that it outputs scanned incoherent electromagnetic radiation 1340 along the optical axis 1342. That is, the scanned radiation 1340 is time multiplexed such that, during a specific scan period, the scanner 1315 scans the whole angular extent of the object 1301 and sequentially outputs the scanned incoherent radiation 1340 along the optical axis 1342.

Similar to the processing of an object beam, as described above in connection with FIG. 2, quasi-phase matching for sum frequency generation takes place inside the PPKTP crystal 1305 between the 1342 nm beam from the solid-state laser 1303 and the focused incoherent radiation 1340. Finally an up-converted object beam 1341 is collimated by the lens arrangement 1332 to a detector 1321, which is configured to detect at 488 nm. The detector detects the collimated light 1341 at each image point (x,y) scanned by the scanner 1315 and provides it to an image processing and display unit 1350 in which an up-converted image 1352 is obtained.

A variaiation of this embodiment is to replace the extended object 1301, the scanner 1315 and the lens with a single mode fibre probe and a lens for collecting light. From LIDAR theory it is known that only light emitted from a small volume around the focus point formed by the fibre tip/lens combination will be efficiently coupled to the fibre. Such an arrangement will allow sampling of a small volume in "mid air" (e.g. inside a burning flame), without probing the intermidiate medium.

Figure 14:
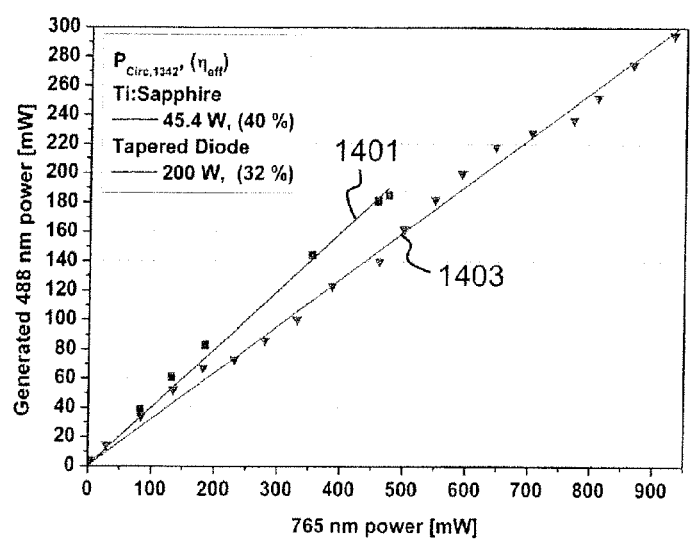
FIG. 14 is a diagram illustrating energy conversion efficiency.

FIG. 14 is a diagram, similar to the diagram in FIG. 5, illustrating energy conversion efficiency during imaging in an apparatus such as the one illustrated in FIG. 13. The line 1401 represents Ti:Sapphire and the line 1403 represents a tapered diode.

Although PPKTP crystals have been used in the examples described above, other crystals can be used, such as Brewster cut PP-LiNbO$_3$ or PP-LiOTiO$_3$ crystals. Moreover, the laser sources described above may be operated in any desired mode, continuous wave as well as pulsed.

The invention claimed is:

1. An arrangement for processing incoming incoherent electromagnetic radiation, said incoming incoherent electromagnetic radiation comprising radiation in a first wavelength interval, the arrangement comprising:— a focusing arrangement for focusing the incoming incoherent electromagnetic radiation,
   a first cavity configured to comprise an intra cavity laser beam,
   a nonlinear crystal arranged in the first cavity such that it is capable of receiving the focused incoherent electromagnetic radiation and, in dependence on the spatial overlap between the focused incoherent electromagnetic radiation and the intra-cavity laser beam, by interaction with the intra-cavity laser beam provide processed electromagnetic radiation, said processed electromagnetic radiation comprising radiation in a second wavelength interval,
   wherein the nonlinear crystal is configured to be quasi phase matched for conversion of the incoming incoherent electromagnetic radiation in the first wavelength interval to the processed electromagnetic radiation in the second wavelength interval, and wherein the transverse dimension of the focused incoming electromagnetic radiation is smaller than the transverse dimension of the intra cavity laser beam so that at least a subset of said plurality of spatial frequencies of the incoming electromagnetic radiation is overlapping the intra cavity beam.

2. The arrangement of claim 1, where the nonlinear crystal is configured to be tuned for obtaining phase matching.

3. The arrangement of claim 1, where the nonlinear crystal is configured to be poled for obtaining phase matching.

4. The arrangement of claim 3, where the nonlinear crystal is configured to be poled in a fanned or chirped manner.

5. The arrangement of claim 1, wherein the crystal is a nonlinear Brewster cut crystal.

6. The arrangement of any of claim 1, configured such that the interaction between the incoming electromagnetic radiation and the intra cavity beam comprises any one of difference frequency generation, DFG, sum frequency generation, SFG, and any combination thereof.

7. The arrangement of claim 1, where the first cavity is a unidirectional ring cavity.

8. The arrangement of claim 1, where the first cavity comprises a frequency selective element for narrowing the bandwidth of the intra cavity beam.

9. A method of processing incoming incoherent electromagnetic radiation, said incoming incoherent electromagnetic radiation comprising light in a first wavelength interval, the method comprising:

focusing the incoming incoherent electromagnetic radiation, maintaining an intra-cavity laser beam in a first cavity, receiving the focused incoherent electromagnetic radiation in a nonlinear crystal arranged in the first cavity and, in dependence on the spatial overlap between the focused incoherent electromagnetic radiation and the intra-cavity laser beam, by interaction with the intra-cavity laser beam providing a processed beam of electromagnetic radiation, said processed beam of electromagnetic radiation comprising radiation in a second wavelength interval, wherein the nonlinear crystal is configured to be quasi phase matched for conversion of the incoming incoherent electromagnetic radiation in the first wavelength interval to the processed electromagnetic radiation in the second wavelength interval, and wherein the transverse dimension of the focused incoming electromagnetic radiation is smaller than the transverse dimension of the intra cavity laser beam so that at least a subset of said plurality of spatial frequencies of the incoming electromagnetic radiation is overlapping the intra cavity beam.

10. An arrangement for processing incoming electromagnetic radiation, said incoming electromagnetic radiation comprising radiation in a first wavelength interval and a plurality of spatial frequencies, the arrangement comprising:

a focusing arrangement for focusing the incoming electromagnetic radiation, a first cavity configured to comprise an intra cavity laser beam, a nonlinear crystal arranged in the first cavity such that it is capable of receiving the focused electromagnetic radiation and, in dependence on the spatial overlap between the focused electromagnetic radiation and the intra-cavity laser beam, by interaction with the intra-cavity laser beam provide processed electromagnetic radiation, said processed electromagnetic radiation comprising radiation in a second wavelength interval and at least a subset of said plurality of spatial frequencies, wherein the nonlinear crystal is configured to be quasi phase matched for conversion of the incoming incoherent electromagnetic radiation in the first wavelength interval to the processed electromagnetic radiation in the second wavelength interval, and wherein the transverse dimension of the focused incoming electromagnetic radiation is smaller than the transverse dimension of the intra cavity laser beam so that at least a subset of said plurality of spatial frequencies of the incoming electromagnetic radiation is overlapping the intra cavity beam.

11. The arrangement of claim 10, configured such that the first cavity is capable of receiving laser energy from a laser source outside the first cavity.

12. The arrangement of claim 10, configured to focus and process incoming electromagnetic radiation that comprises any one of coherent radiation, incoherent radiation and a combination of coherent and incoherent radiation.

13. The arrangement of claim 10, where the first cavity is a unidirectional ring cavity.

14. The arrangement of claim 10, where the first cavity comprises a frequency selective element for narrowing the bandwidth of the intra cavity beam.

15. A method of processing incoming electromagnetic radiation, said incoming electromagnetic radiation comprising light in a first wavelength interval and a plurality of spatial frequencies, the method comprising:

focusing the incoming electromagnetic radiation, maintaining an intra-cavity laser beam in a first cavity,—receiving the focused electromagnetic radiation in a nonlinear crystal arranged in the first cavity and, in dependence on the spatial overlap between the focused electromagnetic radiation and the intra-cavity laser beam, by interaction with the intra-cavity laser beam providing a processed beam of electromagnetic radiation, said processed beam of electromagnetic radiation comprising radiation in a second wavelength interval and at least a subset of said plurality of spatial frequencies, wherein the nonlinear crystal is configured to be quasi phase matched for conversion of the incoming incoherent electromagnetic radiation in the first wavelength interval to the processed electromagnetic radiation in the second wavelength interval, and wherein the transverse dimension of the focused incoming electromagnetic radiation is smaller than the transverse dimension of the intra cavity laser beam so that at least a subset of said plurality of spatial frequencies of the incoming electromagnetic radiation is overlapping the intra cavity beam.

16. The arrangement of claim 1, where the arrangement comprises a detector, such as an Si-based detector, for detecting the processed electromagnetic radiation in the second wavelength interval.

17. The arrangement of claim 1, where the shortest wavelength of the second wavelength interval is shorter than the shortest wavelength of the first wavelength interval, or where the longest wavelength of the second wavelength interval is longer than the longest wavelength of said first wavelength interval.

18. The arrangement of claim 10, where the arrangement comprises a detector, such as an Si-based detector, for detecting the processed electromagnetic radiation in the second wavelength interval.

19. The arrangement of claim 10, where the shortest wavelength of the second wavelength interval is shorter than the shortest wavelength of the first wavelength interval, or where the longest wavelength of the second wavelength interval is longer than the longest wavelength of said first wavelength interval.

20. The arrangement of claim 1, configured so that the intra cavity laser beam is weak focused.

* * * * *